Patented July 1, 1941

2,247,399

UNITED STATES PATENT OFFICE 2,247,399

METHOD OF POLYMERIZING ROSIN AND PRODUCT MADE THEREBY

Robert C. Palmer and Carlisle H. Bibb, Pensacola, Fla., assignors to Newport Industries, Inc., Pensacola, Fla., a corporation of Delaware No Drawing. Application September 28, 1938, Serial No. 232,078

21 Claims. (Cl. 260—97)

This invention relates to a method of polymerizing rosin and to the product made thereby. More particularly, this invention relates to the polymerization of rosin by means of zinc chloride under anhydrous conditions and recovering the partially polymerized rosin without the use of fractional distillation to separate lower melting point constituents from the higher melting point rosin acids.

According to the method of our present invention, not only may the melting point of rosin be increased, but this can be done with little or no sacrifice of the acid number and with an actual improvement, if desired, in the color of rosin, where a dark rosin is used as the starting material. If a pale rosin is treated in accordance with our process, the product is substantially as pale as the starting rosin. Furthermore, our product is entirely free from zinc compounds resulting from the use of zinc chloride as the polymerization catalyst.

In contrast to this feature of our invention, all methods heretofore proposed for increasing the melting point of rosin by means of catalytic polymerization have had the common objection of leaving a portion of the polymerizing materials chemically combined in the rosin. In processes employing concentrated sulfuric acid as the polymerizing agent, as in the Morton Patent No. 2,017,866 and the Rummelsburg Patent No. 2,108,928, for example, the rosin product contains combined sulfur, which forms hydrogen sulfide and sulfur dioxide when the rosin is subsequently used for soap, varnish, ester gum and other purposes.

In the Schnorf Patent No. 2,074,192, corresponding metal resinates are formed in amounts depending upon the amount of polymerization agent used and the conditions of operation. We have now discovered that of the metallic halides referred to in this patent, zinc halides are the only ones that can be readily and completely separated from the treated rosin. The process for accomplishing the complete removal of zinc from the partially polymerized rosin constitutes an important part of our present invention.

If, in carrying out the processes of prior patents above referred to, it is desired to maintain or improve the color, as well as substantially increase the melting point of the rosin treated, it is invariably done at a considerable sacrifice in yield and also reduction in other values of the rosin, such as acid value. We have discovered that under proper conditions zinc chloride is capable of giving 100% yield of product of substantially the same acid value and with an increase in melting point of from 15 to 25° C. (measured by the capillary tube method), while at the same time retaining substantially the same color grade as that of the original rosin. The modifications of the prior art processes necessary to accomplish this result also form a part of our present invention.

The patent to Schnorf No. 2,074,192 quite evidently refers to the treatment of dark or crude rosin as the starting material, since the patent describes the treated rosin as being "not black but reddish when viewed in small particles." Consequently it does not appear that Schnorf contemplated the use specifically of zinc chloride in treating a highly purified pale wood or gum rosin. Neither, apparently, did Schnorf contemplate obtaining directly, and without fractional distillation, a polymerized rosin of substantially higher melting point than that of the starting rosin.

The treatment of pale wood or gum rosin to obtain directly a partially polymerized rosin product of substantially equivalent color grade and of greatly increased melting point is an important object of this invention. In our process, starting with WW wood rosin, we get a pale finished product with an increase in melting point of from 15 to 20° C. without subjecting the rosin to partial distillation, and we produce no soft materials and maintain the original acid value.

Our studies of the optical properties of partially polymerized rosins, produced by our process using zinc chloride, have led to interesting conclusions. By way of example, WW rosin having initially a rotation of −13 was partially polymerized by zinc chloride to give a product having a melting point of 76° C. and a rotation of −5. Fractional distillation under reduced pressure yielded a 45% pale middle fraction (after taking off small amounts of soft heads) having an acid value of 177 and a rotation of +20, and a 35% non-volatile residue of dibasic rosin acid of melting point 120° C. and rotation −40, all rotation tests being taken in 10% petroleum naphtha solution.

Fieser and Campbell, in the "Journal of the American Chemical Society," January 1938, clearly show that the only forms of rosin acids, obtained by the chemical processing of abietic acid, which have positive optical rotation are hydroxy abietic, dehydrogenated abietic and hydrogenated abietic acid. Since hydroxy abietic acid could not be formed by our process, the foregoing optical rotation results clearly indicate that in our polymerization process, the zinc chloride acts as a simultaneous hydrogenation and dehydrogenation catalyst to form what is known as disproportionated abietic acid, i. e. both dehydro and dihydro abietic acid in admixture.

Nickel, platinum and palladium, and copper or zinc chromates have previously been suggested as catalysts to produce this simultaneous hydrogenation and dehydrogenation, but to the best of our knowledge the use of zinc chloride for this purpose has not been heretofore known. Heat treatment alone of the rosin produces this same effect, as shown in the Logan Patents Nos. 1,643,276 and 1,807,483 and proved by Fleck and Palkin (Journal of the American Chemical Society, April 1938).

Thus, in practicing the method of our invention, using zinc chloride as catalyst, we obtain two effects, polymerization and disproportionation, but neither to completion. We may, therefore, further process the partially polymerized rosin by subjecting it to heat treatment, as for instance by heating the rosin for 1 to 6 hours at between 250° and 300° C., and carry the dehydrogenation-hydrogenation reaction still further. This subsequent treatment enables us to destroy traces of color bodies formed in the polymerization process to impart to the rosin product maximum stability as respects color, along with an increase in melting point. The final rosin product is a distinctly novel product not heretofore obtained to the best of our knowledge.

This rosin product may further be subjected to a vacuum topping operation, as disclosed in the Palmer and Oliver Patent No. 1,881,907, to remove soft materials, if any have been formed, or to a fractional distillation step to effect complete separation. In the latter case, a high quality pale rosin product containing substantial quantities of dehydro-, dihydro rosin acids is produced, which is very stable as to color when made into a varnish, ester gum or the like, and there is also produced a residue of pale color, grading K or better on the standard color scale, of a melting point of 110° C. or higher and consisting largely of polybasic rosin acids.

It is therefore an important object of this invention to provide a method of increasing the melting point of rosin, either gum or wood and either dark or pale, while at the same time maintaining substantially the same acid value of the starting rosin and obtaining yields approaching 100%.

It is a further important object of this invention to provide a method of polymerizing rosin by the action of heat and a zinc halide and under strictly anhydrous conditions to prevent degradation in the color of the rosin.

It is a further important object of this invention to provide a process whereby a partially polymerized rosin may be obtained entirely free from zinc compounds introduced into the rosin by zinc chloride used as the polymerization catalyst.

It is a further important object of this invention to provide a process of treating rosin that includes both partial polymerization and partial dehydrogenation and hydrogenation of the abietic acid to give a rosin product of high melting point and possessing a high degree of a color stability when made into a varnish, ester gum or the like.

It is a further important object of this invention to provide the wood rosin products resulting from the processes described herein, which products are free from zinc compounds resulting from the use of zinc chloride and have substantially higher melting points and not substantially lower acid values than the starting rosin.

Other and further important objects of this invention will become apparent from the following description and appended claims.

Our method of obtaining a rosin of higher melting point than the starting material involves the partial polymerization of rosin, either gum or wood, by the use of a zinc halide as the polymerization catalyst. The removal of any zinc from the rosin product is based upon the discovery that the water soluble zinc salts of the water soluble organic or inorganic acids stronger than abietic acid can be readily and completely separated from solutions of the polymerized rosin. Thus, by simply reacting the zinc resinate present in the solution of the partially polymerized rosin with an aqueous solution of an acid stronger than abietic acid, such as formic, acetic, sulfuric or hydrochloric acids, followed by water washing, the zinc salt of the corresponding stronger acid used can be completely extracted from the rosin product.

The solvent preferably used is a petroleum hydrocarbon boiling between 105 and 140° C. Such a solvent has been arbitrarily selected primarily because the reflux temperature of the rosin solution, using such a solvent and at the desired rosin concentration, affords an easy control of the polymerization reaction. A wide range of petroleum solvents is equally effective. In fact any organic solvent that is inert during the reaction, i. e. does not itself become polymerized or chemically react with the rosin, may be employed, including aromatic hydrocarbons such as benzene, toluene and the like.

While the polymerization of the rosin can be conducted in the absence of any solvent, this is not practical because in order to obtain the most favorable temperature conditions for preventing color degradation, say not exceeding 140° C., the polymerized rosin toward the end of the reaction would be too viscous to permit the extensive contact with the catalyst that is required for efficient carrying out of our process. The use of a solvent is therefore, important to the obtaining of the desired improvements in our process.

The concentration of rosin in the solvent is also important. If the concentration of rosin is less than about 50% of rosin by weight of the solution, the polymerizing effect is not great. Even in concentrations below 60%, there is a reduction in the polymerizing effect. We have found that at between 62 and 70% concentration of rosin in the solution, the most favorable effects as regards color, maximum polymerization, acid value retention and the like are realized.

We have discovered that the prevention of color degradation using zinc chloride as the polymerizing agent is controlled by (1) maintenance of a suitable temperature of the reaction, and (2) maintenance of anhydrous conditions. We fully recognize that the desirability of employing approximately anhydrous conditions for polymerization reactions using zinc chloride has been known previously, but solely for the purpose of maintaining the proper reaction velocity. For all practical purposes a petroleum naphtha solution of rosin would, we believe, be considered substantially anhydrous, but for the purpose of maintaining the color of a rosin polymerized with zinc chloride we do not find this to be the case.

Our investigations show that it is necessary to reflux the rosin solution to remove as little as 0.2% of water (which amount would normally be present in rosin recovered by steam distillation from solvent and would remain dissolved upon resolution of such rosin to a concentration of 50% or higher without giving a cloudy solution) in order to secure the desired anhydrous conditions. For example, if a 66⅔% petroleum solution of commercial WW wood rosin having a melting point of 60° C. and an acid value of 168 is heated for 12 to 16 hours with 1½% of dry granular zinc chloride at 128–138° C., the resulting rosin, after recovery and after being freed of zinc resinate, will have a melting point of 76° C., an acid value of 166 and color K. If the same operation be repeated, but if before adding the catalyst we secure anhydrous conditions by refluxing the rosin solution through a condenser containing a water trap and separating 0.2% water, the resulting rosin will have the same increase in melting point but will grade WG+ and also have an acid value of 166. Thus, a rosin solution, for the purposes of this invention, is not anhydrous unless it is free of all water that can be removed by refluxing over a reasonable period.

If the reaction be carried out at 145° C. or over, water is formed, the acid value of the recovered rosin will drop to 153 and the color will be I or K. We have, therefore, discovered that not only must anhydrous conditions be present initially but they must be maintained by proper temperature control. At the higher reaction temperatures the action of the polymerizing catalyst is also that of decarboxylation and both water and hydrochloric acid are formed. We believe that hydrochloric acid, which would be formed by hydrolysis of zinc chloride, is the cause of the discoloration, and hydrochloric acid is not formed unless water is initially present or is generated during the polymerization reaction. Consequently, we carry out our polymerization under such conditions that not more than the minimum amount of hydrochloric acid is formed.

No matter what the starting grade of rosin, the color can be substantially maintained after the partial polymerization treatment if the above conditions are followed. However, in order to obtain an approximately 100% yield or equivalent color grade, together with increase in melting point of around 15° C., the kind and grade of rosin is also more important. We have discovered that no rosin containing appreciable quantities of oxygenated materials can be treated by this process and retain the original color grade without sustaining loss as dark resin. For example, WG to WW grade wood or gum rosins or equivalent as regard presence of oxygenated bodies will give substantially 100% yields of partially polymerized rosins of say N to WW color. The presence of oxygenated bodies also interferes with the polymerization to some extent. For example, an M grade fuller's earth purified wood rosin gave 94% yield, K+ grade, with only 10° C. increase in melting point, and K grade furfural purified wood rosin gave 85% yield I grade with only 5° C. increase in melting point using exactly the same procedure as gave 99% yield, WG grade, with 15° C. increase in melting point starting with fuller's earth purified WW grade wood rosin.

The following example will illustrate a preferred embodiment of our invention:

*Example 1*

9600 pounds of WW wood rosin are dissolved in 770 gals. of petroleum solvent boiling between 105 and 140° C. to give a 66% solution of rosin by weight.

The rosin solution so prepared is first dehydrated. This may be accomplished by placing the solution in a still provided with a reflux condenser and a trap for catching any water found to be present in the distillate. The refluxing operation is carried out until only the merest trace of water is left in the solution. The solution is then allowed to cool somewhat to below its boiling point of 132° to 134° C., and 144 lbs. of dry "technical granular" zinc chloride are added slowly in order to avoid undue boiling and subsequent danger of the solution surging over the top of the containing vessel.

Since exposure of zinc chloride to humid air causes it to pick up considerable moisture, such exposure of the zinc chloride prior to actual use is to be avoided.

The amount of zinc chloride added corresponds with 1½% by weight of the rosin undergoing treatment. With this percentage of catalyst, best results are obtained by carrying out the reaction for 12 to 16 hours. The reaction time will vary somewhat with the proportion of catalyst used.

The temperature of the reaction mass during the entire period is kept at about 128 to 138° C., or just under the boiling point of the solution.

At the end of the reaction time, the hot rosin solution is washed as follows, maintaining the washes as well as the rosin solution at about 75° to 80° C.:

| Wash | Volume |
|---|---|
| 1st | 400 gals. water. |
| 2d | 120 gals. 1.5% sulfuric acid. |
| 3rd | 400 gals. water. |
| 4th | Do. |
| 5th | Do. |

Any undissolved zinc chloride and traces of "tarry" matter dissolve in the first wash water. The fifth wash should be free of zinc compounds but washing should be carried out until tests show the absence of zinc compounds and also the absence of chlorides and sulfates.

The washing step is preferably carried out in the reaction vessel by mechanical agitation. Since the solution contains no emulsifying agents, the water settles out rapidly upon cessation of the agitation.

The washed rosin solution is next transferred to a suitable still, where the solvent is evaporated off by passing dry steam through the solution in the still. Final steaming at 210° to 220° C. still temperature is recommended. It is possible to use lower finishing temperatures, but the rosin is quite viscous even at 180° C. with the higher melting types resulting from the polymerization reaction. To obtain the desired melting point of 76° to 77° C., it is necessary that all traces of solvent be steamed off of the rosin.

The foregoing process has readily produced a rosin of the following properties:

Color _____ WG
Melting point _____ 75° to 80° C.
Acid value _____ 164 to 167
Rotation _____ −4 to −8
Ash _____ Less than 0.01%

In stating the melting point of rosin or any of the rosin products described herein, it will be understood that such melting points have been determined by the capillary tube method. For the sake of comparison, however, the following relationship exists between the capillary tube method and the so-called drop method, referred to in the Schnorf Patent No. 2,074,192:

76° C. (drop) equals 52° capillary tube
76° C. capillary tube equals 100° C. drop method Higher melting point rosin is obtainable at the expense of using more catalyst and at a sacrifice in color grade and a lowering of acid value. The reaction time can be shortened to from 4 to 8 hours by increasing the proportion of catalyst used to a maximum of 3%, and the color grade can be maintained under these conditions. In general, however, longer time of reaction with any given amount of catalyst tends to give a higher melting point, lower grade and lower acid value in the polymerized product. 1½% of catalyst is the practical minimum in any case.

Hot water is recommended in the washing operation because in view of the high rosin concentration it is obviously necessary that the rosin solution be kept fluid. As an alternative procedure, the rosin solution at the end of the reaction may be diluted and the washing conducted with hot or cold water.

If it is desired to secure the maximum amount of disproportionation of the rosin acid, the partially polymerized rosin may be heat treated at 260° to 270° C. for about 2 to 3 hours, in accordance with the method of the Logan Patent No. 1,807,483, dated May 26, 1931. This treatment alone will improve the color a grade or more on the color scale, but will also lower the acid value somewhat and decrease the melting point several degrees C., both being the effect of unavoidable decarboxylation during the hydrogenation dehydrogenation by heat. After the rosin has been subjected to the action of heat and zinc chloride in accordance with the procedure of the foregoing example and heat treated as just described, the resulting product is then fractionally distilled under reduced pressure to separate as the first fraction about 12% of a yellow colored semi-solid rosin of acid value about 88 and optical rotation of +48, and as a second fraction about 12½% of pale (X+) rosin, having a melting point of about 53° C., acid value of 158 and rotation of +31. The residue will have a melting point of 95 to 100° C., a color of N grade or better and an acid value of about 145 and an optical rotation of −11.

If it be desired to convert the maximum amount of the starting rosin to a polymerized rosin, the time of reaction, using 1½% of zinc chloride catalyst, is simply increased. A reaction period of about 90 hours results in a grade I to K rosin, having an acid value of 148, a melting point of 90° C. and an optical rotation of −25. This product upon vacuum fractionation and the removal of 10% of soft material, having an acid value of 77.5 and a rotation of +5, gives a residue rosin with a melting point of 109° C., an acid value of 158, a rotation of −27 and a color grading I to K.

While the novel features of our process have been described principally as applied to pale rosins as starting material, the principles of our invention can also be applied to a combination process for effecting polymerization and refining of starting rosins containing oxygenated materials, such as FF or intermediate grades of wood rosin.

The following example will serve to illustrate a preferred embodiment of our invention as applied to FF wood rosin as the starting material:

Example 2

FF wood rosin, having a melting point of 53° C., and an acid value of 153, is subjected to the action of zinc chloride, using 1½% of zinc chloride by weight of the rosin and a rosin solution containing 66% of rosin by weight, the same as described in Example 1. A 100% yield of partially polymerized rosin is obtained, having the same color grade as the starting rosin and having a melting point of 68.5° C. and an acid value of 148. If, however, before washing out any combined zinc, the rosin solution is diluted from 66% concentration down to 12% to 15% concentration, there occurs a precipitation of about 8% of nigre, which may be removed to give a partially polymerized rosin grading, after recovery, a brighter colored FF.

When this partially polymerized rosin is given successive polymerization treatments in the same manner, the second treatment results in a G grade rosin having a melting point of 76.5° C. and an acid value of 147.5; the third treatment also gives a G grade rosin, but having a melting point of 80° C. and an acid value of 146, with a loss in yield of about 8% between successive treatments. An attempt to produce the same result using one treatment of 5% zinc chloride and a reaction time of 5 hours gave a rosin of melting point 72° C., acid value 147, color bright FF, with but one loss of 8% in yield. A repetition of the treatment using 10% catalyst, a reaction time of 2 hours, resulted in a 75% yield of rosin grading G+ and having a melting point of 66° C. and an acid value of 151.

A large variation in the method is, therefore, possible. This partially purified, partially polymerized rosin can be further refined by treatment with selective solvents, such as furfural, or by means of fuller's earth or equivalent decolorizing material. A partially polymerized rosin grading FF and having a melting point of 72° C. and an acid value of 147, was bleached to M grade rosin having a melting point of 70° C. and an acid value of 155, by the use of fuller's earth. In general, the polymerized dark rosins do not decolorize as readily as natural rosin, so that for practical economical purposes we prefer to conduct our polymerizing reaction on already highly purified rosin.

The various products produced in accordance with the processes of our invention as herein described may be distinguished from heretofore known products in several ways. With respect to the partially polymerized rosin product resulting directly from the polymerized step using zinc chloride, this product is distinguished from that of the Schnorf Patent No. 2,074,192 by a complete absence of any zinc compounds and also by the fact that it has an acid value substantially as high as that of the starting rosin, whereas Schnorf specifically states that his product contains traces of a metallic chloride and has a lower acid value than the starting rosin. The patent to Morton No. 2,017,866 also particularly refers to a drop of from 10 to 20% in the acid value after polymerization. The product of our process prior to any heat treatment, has no substantial drop in acid value. As a typical example, a rosin having initially an acid value of 168 may be processed in accordance with our invention to produce a partially polymerized rosin having an acid value of 166, representing a drop of less than 2% as the maximum.

In the process of the Schnorf Patent No. 2,074,192, a certain amount of color degradation takes place, whereas there is no degradation in color in our process except where an extremely long reaction time is employed.

Another distinction between the process of the Schnorf patent and that of our invention resides in the treatment of the partially polymerized rosin product resulting from the polymerization step. We have combined the partial polymerization step with a heat treatment step to increase the formation of dehydro and dihydro abietic acid in the rosin product and at the same time improve its grade.

We are aware that numerous details of the process may be varied through a wide range without departing from the principles of this invention, and we therefore do not purpose limiting the patent granted hereon otherwise than necessitated by the prior part.

We claim as our invention:

1. In the process of preparing a polymerized rosin, the step of heating at least a 50% solution of rosin to a temperature not over about 145° C. in a solvent chemically inert to zinc chloride and in the presence of zinc chloride under anhydrous conditions and maintaining such conditions throughout the entire heating step.

2. In the process of preparing a polymerized rosin product by heating rosin in solution in the presence of anhydrous zinc chloride, the preliminary step of freeing the rosin solution from all but a trace of water.

3. In the process of preparing a polymerized rosin product by heating rosin in solution in a petroleum solvent in the presence of anhydrous zinc chloride, the preliminary steps of refluxing the rosin solution and removing water from the solvent distillate so formed until not more than a mere trace of water is left in said solution.

4. In the process of preparing a polymerized rosin product by heating pale wood rosin dissolved in an inert organic solvent in the presence of anhydrous zinc chloride, the step of removing all but the merest trace of water from the solution of said rosin in said solvent prior to heating said solution in the presence of zinc chloride to prevent substantial color degradation of said rosin during polymerization.

5. The process of preparing a polymerized rosin product, which comprises heating an anhydrous solution of rosin in an inert organic solvent in the presence of zinc chloride.

6. The process of preparing a polymerized rosin product, which comprises heating an anhydrous solution of pale rosin in an inert organic solvent in the presence of zinc chloride and maintaining anhydrous conditions in the resulting reaction mass until the desired degree of polymerization is obtained to prevent any substantial degradation in color from that of the original pale rosin.

7. The process of preparing a polymerized rosin product of pale color, which comprises heating an anhydrous solution of pale wood rosin in a petroleum solvent of boiling point between 105 and 140° C. in the presence of anhydrous zinc chloride to a temperature under the boiling point of said solution until the desired degree of polymerization is obtained.

8. The process of preparing a polymerized rosin product of pale color, which comprises heating an anhydrous solution of pale wood rosin in a petroleum solvent of boiling point between 105 and 140° C. in the presence of anhydrous zinc chloride to a temperature under the boiling point of said solution until the desired degree of polymerization is obtained, washing said solution with acidified water and plain water until free from zinc compounds, and recovering the polymerized rosin product from the solution.

9. The process of preparing a polymerized rosin product, which comprises forming a solution of rosin in an inert organic solvent free from more than the merest trace of water, adding anhydrous zinc chloride to said solution, heating said solution at a temperature such as to effect polymerization of said rosin without introducing water into said solution and separating the polymerized rosin from said solvent and any zinc compound including said zinc chloride.

10. The process of treating rosin, which comprises heating under anhydrous conditions a solution of rosin dissolved in an inert organic solvent and in the presence of zinc chloride to simultaneously polymerize and dehydrogenate and hydrogenate said rosin to produce a polymerized disproportionated rosin product and recovering said rosin product free from any zinc compound.

11. The process of treating rosin, which comprises heating under anhydrous conditions a solution of pale wood rosin dissolved in an inert organic solvent and in the presence of zinc chloride to simultaneously polymerize and dehydrogenate and hydrogenate said rosin to produce a polymerized disproportionated rosin product of substantially the same color grade as the original pale wood rosin and recovering said rosin product free from any zinc compound.

12. The process of treating rosin, which comprises heating under anhydrous conditions a solution of rosin dissolved in an inert organic solvent equivalent to a petroleum solvent of boiling point between 105 and 140° C. and in the presence of zinc chloride to a temperature below the boiling point of said solution but sufficiently high and for a sufficiently long period of time to effect a simultaneous polymerization, dehydrogenation and hydrogenation of said rosin, washing said solution with acidified and plain water to remove all inorganic elements and compounds and recovering the polymerized disproportionated rosin product entirely free of zinc compounds and having an acid number substantially the same as and a melting point substantially higher than the original rosin.

13. The method of polymerizing rosin, which comprises subjecting rosin in solution under anhydrous conditions to the action of zinc chloride and heat at a temperature under 145° C. for a sufficient length of time to effect the desired degree of polymerization of said rosin, washing said solution free from zinc and chlorides, and steam distilling off the rosin solvent to recover directly a polymerized rosin product having a substantially higher melting point than the original rosin.

14. The method of polymerizing rosin, which comprises subjecting a heat treated pale wood rosin in a solution of at least 50% rosin concentration by weight under anhydrous conditions to the action of zinc chloride and heat at a temperature under 145° C. for a sufficient length of time to effect the desired degree of polymerization of said rosin, washing said solution free from zinc and chlorides, and steam distilling off the rosin solvent to recover directly a polymerized rosin product having a substantially higher melting point than the original rosin.

15. The method of preparing a polymerized disproportionated rosin from rosin which has already been subjected to the action of heat and zinc chloride under anhydrous conditions to polymerize, dehydrogenate and hydrogenate said rosin, which comprises heating such previously treated rosin between 250° and 300° C. for a sufficient length of time to further dehydrogenate and hydrogenate the same.

16. In the method of polymerizing rosin by subjecting said rosin to the action of heat and zinc chloride, the step of removing zinc from the polymerized rosin product which comprises washing said product with an aqueous solution of an acid stronger than abietic acid until all of the zinc is dissolved in said solution and recovering the polymerized rosin product.

17. The method of increasing the melting point of rosin without appreciable loss of acid value or degradation of color, which comprises heating pale rosin dissolved in an inert solvent in the presence of zinc chloride under anhydrous conditions until the desired amount of polymerization has occurred, washing the reaction mass with an aqueous solution of an acid stronger than abietic to remove all zinc from the polymerized rosin product and recovering said product free of solvent.

18. The method of increasing the melting point of rosin which comprises heating pale rosin dissolved in an inert solvent in the presence of zinc chloride under anhydrous conditions until the desired amount of polymerization has occurred, washing the reaction mass with an aqueous solution of an acid stronger than abietic to remove all zinc from the polymerized rosin product, recovering said product free of solvent, heat treating said product at 250–300° C., vacuum distilling said product to remove lower melting point constituents therefrom and recovering the resulting high melting point polymerized rosin product remaining after such distillation.

19. The method of increasing the melting point of rosin without appreciable loss of acid value or degradation of color, which comprises heating pale rosin dissolved in an inert solvent in the presence of zinc chloride under anhydrous conditions until the desired amount of polymerization has occurred, washing the reaction mass with an aqueous solution of an acid stronger than abietic to remove all zinc from the polymerized rosin product, recovering said product free of solvent, heat treating said product at 250–300° C., vacuum fractionating said product to remove lower melting point constituents therefrom and separating a pale high plus rotation rosin until only non-distillable substantially dibasic rosin acid having a pale color and a capillary tube melting point of at least as high as 110° C. remains and recovering the same.

20. The method of polymerizing and refining dark wood rosin, which comprises subjecting dark wood rosin in an inert organic solvent solution having a concentration of at least 50% rosin by weight under anhydrous conditions to the action of heat and zinc chloride until polymerization has progressed to the desired extent, diluting the resulting solution to effect the precipitation of nigre therefrom, and recovering the partially polymerized rosin from said solution free from all zinc compounds and lighter in color than the original rosin.

21. The method of polymerizing and refining dark wood rosin, which comprises subjecting dark wood rosin in an inert organic solvent solution having a concentration of at least 50% rosin by weight under anhydrous conditions to the action of heat and zinc chloride until polymerization has progressed to the desired extent, diluting the resulting solution to effect the precipitation of nigre therefrom, recovering the partially polymerized rosin from said solution free from all zinc compounds and lighter in color than the original rosin and subjecting said partially polymerized rosin to the action of fuller's earth to remove color bodies therefrom.

ROBERT C. PALMER.
CARLISLE H. BIBB.

DISCLAIMER 2,247,399.—*Robert C. Palmer* and *Carlisle H. Bibb*, Pensacola, Fla. METHOD OF POLYMERIZING ROSIN AND PRODUCT MADE THEREBY. Patent dated July 1, 1941. Disclaimer filed August 2, 1943, by the assignee, *Newport Industries, Inc.*

Hereby enters this disclaimer to claim 16 in said specification.

[*Official Gazette August 31, 1943.*]